(12) United States Patent
Boström

(10) Patent No.: US 8,179,024 B2
(45) Date of Patent: May 15, 2012

(54) PIEZOELECTRIC TRANSDUCER DEVICE

(75) Inventor: Jan Boström, Göteborg (SE)

(73) Assignee: Axsensor AB, Gothenburg (SE)

( * ) Notice: Subject to any disclaimer, the term of this patent is extended or adjusted under 35 U.S.C. 154(b) by 247 days.

(21) Appl. No.: 12/451,737

(22) PCT Filed: May 30, 2008

(86) PCT No.: PCT/SE2008/050633
§ 371 (c)(1),
(2), (4) Date: Mar. 9, 2010

(87) PCT Pub. No.: WO2008/147325
PCT Pub. Date: Dec. 4, 2008

(65) Prior Publication Data
US 2010/0201226 A1  Aug. 12, 2010

(30) Foreign Application Priority Data

Jun. 1, 2007  (SE) ...................................... 0701350

(51) Int. Cl.
*H01L 41/09* (2006.01)
(52) U.S. Cl. ........................................ 310/354; 310/326
(58) Field of Classification Search .................. 310/334, 310/335, 336, 327, 326, 348, 349, 321, 369, 310/354; *H01L 41/08*
See application file for complete search history.

(56) References Cited

U.S. PATENT DOCUMENTS

| | | | |
|---|---|---|---|
| 3,625,058 A | | 12/1971 | Endress |
| 4,297,607 A | | 10/1981 | Lynnworth |
| 4,626,732 A | * | 12/1986 | Debaisieux et al. .......... 310/348 |
| 4,800,316 A | * | 1/1989 | Ju-Zhen ........................ 310/327 |
| 5,195,142 A | * | 3/1993 | D'Avolio et al. ............. 310/324 |
| 5,515,733 A | | 5/1996 | Lynnworth |
| 2002/0041130 A1 | | 4/2002 | Herrmann |
| 2005/0054932 A1 | | 3/2005 | Kochan |

FOREIGN PATENT DOCUMENTS

| | | |
|---|---|---|
| EP | 1515303 | 3/2005 |
| GB | 1250537 | 10/1971 |
| GB | 1310853 | 3/1973 |
| WO | WO 2005/038415 | 4/2005 |
| WO | WO 2007/083497 | 7/2007 |

OTHER PUBLICATIONS

International Search Report, Oct. 9, 2008.

\* cited by examiner

*Primary Examiner* — Thomas Dougherty
*Assistant Examiner* — Karen B Addison
(74) *Attorney, Agent, or Firm* — Harness, Dickey & Pierce, P.L.C.

(57) ABSTRACT

The present invention relates to a transducer device (10), comprising: an acoustic membrane (14); a piezoelectric element (12) mounted to the acoustic membrane; two oppositely arranged elastic damping elements (16a, 16b) between which a peripheral portion (22) of the acoustic membrane is sandwichably supported; and a clamp (28) having two surfaces (30a, 30b) between which the two elastic damping elements are clamped so that the two elastic damping elements are pressed together, whereby the peripheral portion of the acoustic membrane is secured between the two elastic damping elements. The present invention also relates to a method of assembling such a transducer device.

10 Claims, 2 Drawing Sheets

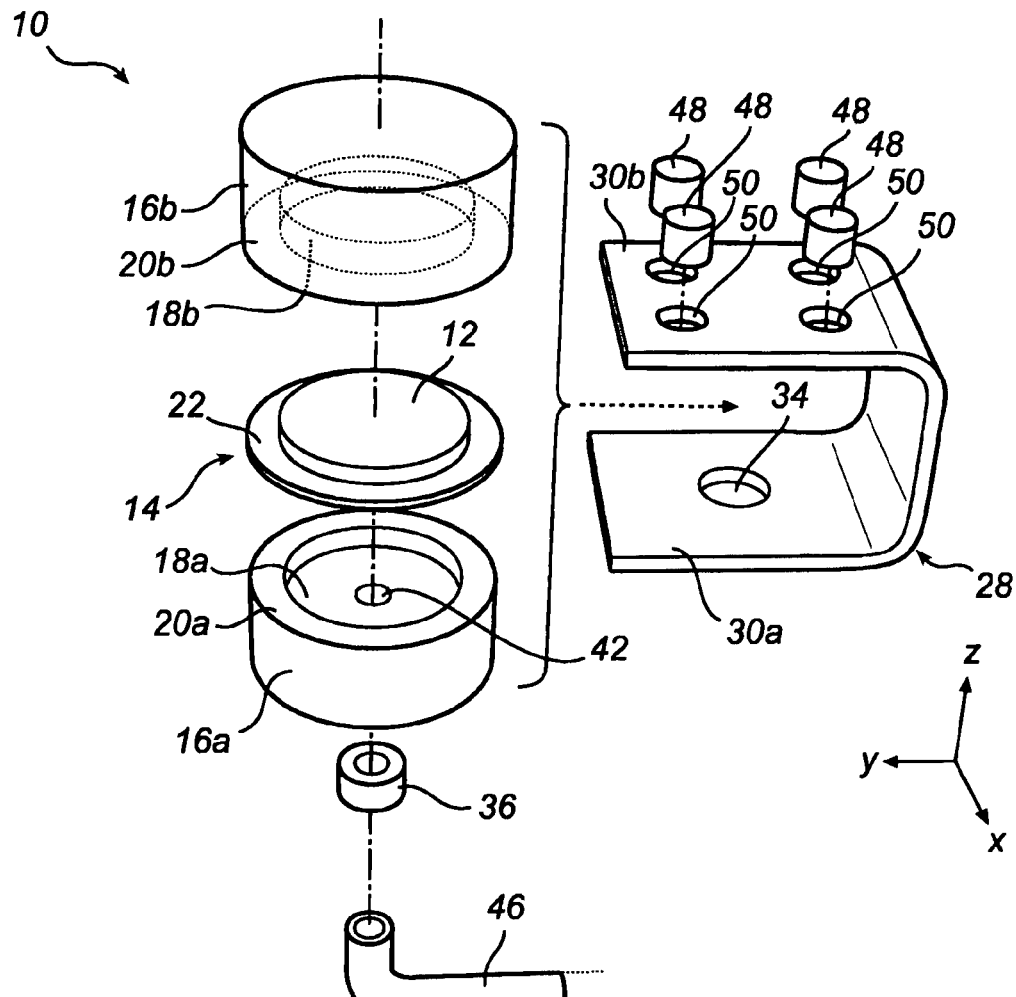
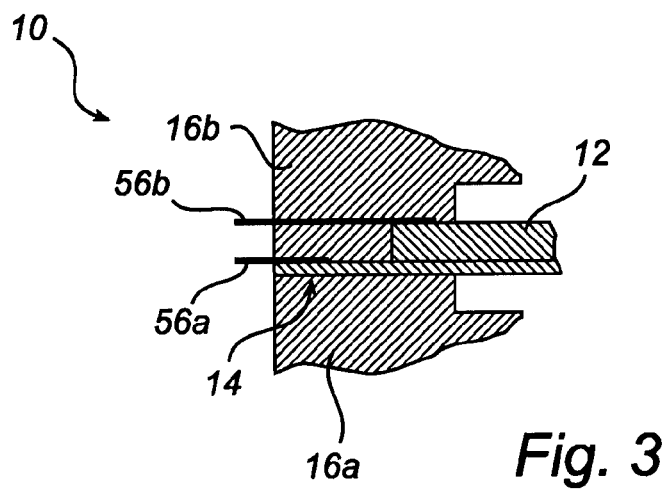

PIEZOELECTRIC TRANSDUCER DEVICE

FIELD OF THE INVENTION

The present invention relates to a piezoelectric transducer device. The present invention also relates to a method of assembling such a piezoelectric transducer device.

BACKGROUND OF THE INVENTION

Piezoelectricity is the voltage generated over some materials, e.g. some crystals, when they are subjected to mechanical deformation. Conversely, a voltage applied over the material causes a mechanical deformation of the material. It is well known to use this piezoelectric principle in many applications, such a piezoelectric pressure sensors, microphones, loudspeakers, actuators, and other transducers.

An example of a piezoelectric transducer device, namely a piezoelectric speaker, is disclosed in GB1310853. The piezoelectric speaker in GB1310853 includes a circular piezoelectric element mounted on a thin circular diaphragm. The thin circular diaphragm is supported at its circumference on a supporting member, which is a portion of a housing, and clamped tight by a tightening member. In one embodiment, annular members of resilient material are respectively disposed between the thin diaphragm and the supporting member and tightening member, to damp the circular diaphragm. However, in this solution, means are required to fasten the tightening member to the supporting member, complicating the construction and assembly of the speaker.

SUMMARY OF THE INVENTION

It is an object of the present invention to at least partly overcome these problems, and to provide an improved piezoelectric device, which device in particular is easy to assemble and further may have good damping characteristics.

These and other objects that will be apparent from the following summary and description are achieved by a piezoelectric transducer device, and a method of assembling such a piezoelectric transducer device, according to the appended claims.

According to one aspect of the present invention, there is provided a transducer device, comprising: an acoustic membrane; a piezoelectric element mounted to the acoustic membrane; two oppositely arranged elastic damping elements between which a peripheral portion of the acoustic membrane is sandwichably supported; and a clamp having two surfaces between which the two elastic damping elements are clamped so that the two elastic damping elements are pressed together, whereby the peripheral portion of the acoustic membrane is secured between the two elastic damping elements.

Thus, in the present invention, a single member (i.e. the clamp) is enough to constrict or hold the two elastic damping elements together, which simplifies the construction and assembly of the transducer element. Further, by securing the peripheral portion of the acoustic membrane between the two elastic damping elements, good damping of the acoustic membrane may be achieved. Further, the clamp may be resilient to allow the two elastic damping elements to shrink or expand (due to for instance environmental conditions), to maintain the device functionality even in harsh conditions. The resilient property may be achieved by appropriately dimensioning and/or shaping the clamp and/or selecting a suitable material of the clamp.

Preferably, the two elastic damping element are appropriately shaped so as to only engage said peripheral portion of the acoustic membrane, e.g. like cups or rings, though the two elastic damping elements could extend further towards the centre of the acoustic membrane/piezoelectric element such that one of the two elastic damping element also engages a portion of the piezoelectric element.

In one embodiment, the clamp is substantially U-shaped, wherein the two surfaces are two arms connected by a linking portion. For the U-shaped clamp, the above resilient property may easily be obtained, and the two elastic damping parts may easily be mounted and received in it. Alternatively, the clamp may have the shape of an elongated O, wherein the two surfaces are connected by two linking portions.

In one embodiment, the clamp is provided with an through opening to allow acoustic communication between the acoustic membrane and a waveguide. The waveguide may serve to guide acoustic signals to and from the transducer, and it may be part of the device or an external waveguide.

In one embodiment, the transducer device further comprises at least one further elastic damping element for attaching the rest of the transducer device to an external base. The further elastic damping element(s) may absorb unwanted vibrations and prevent them from being transferred to and from the rest of the transducer device. The further elastic damping elements may be fitted in holes in the clamp, for instance in the above mentioned through opening (in which case the further elastic damping element preferably is ring-shaped to maintain the acoustic communication), or in a dedicated hole. Alternatively, the further elastic damping elements may be attached (e.g. glued) to the outside of the clamp. The former variant is advantageous in that no gluing or the like may be necessary.

In one embodiment, the clamp is made of metal, which may be selected and dimensioned to achieve the resilient property and at the same time withstand various operating environments. Alternatively, the clamp can be made of plastics, for use in a more limited temperature range.

In one embodiment, the peripheral portion of the acoustic membrane includes a vibration node of the acoustic membrane. A vibration node is a point along a non-secured membrane where the amplitude when the membrane vibrates is minimal. This may further enhance the damping of the acoustic membrane.

In one embodiment, each of the two opposed elastic damping elements comprises a recess, the two recesses together forming a cavity for accommodating the non-supported portion of the membrane. Thus, the two opposed elastic damping elements may more or less enclose the acoustic membrane and piezoelectric element, to prevent or reduce transfer of unwanted vibrations, while each non-recessed portion facing the acoustic membrane may be adapted to secure the peripheral portion of the acoustic membrane. In this embodiment, when using the above waveguide, the elastic damping element next to the through opening in the clamp should have an opening to maintain the acoustic communication between the acoustic membrane and the waveguide. In an alternative embodiment, the two opposed elastic damping elements may have an annular or ring shape.

In one embodiment, the device further comprises at least one electrically conducting wire in contact with the acoustic membrane and/or the piezoelectric element, which at least one wire is sandwiched in the device between the elastic damping elements. In this way, no soldering or the like to connect the wire(s) to the acoustic membrane or the piezoelectric element is necessary, and any vibrations in the wire(s) may be attenuated.

According to another aspect of the present invention, there is provided a method of assembling a transducer device comprising a piezoelectric element mounted to an acoustic membrane, the method comprising the steps of: placing the acoustic membrane between two elastic damping elements embodied so that a peripheral portion of the acoustic membrane is sandwichably supported therebetween; and placing the two elastic damping elements between two surfaces of a clamp so that the two elastic damping elements are pressed together, whereby the peripheral portion of the acoustic membrane is secured between the two elastic damping elements. This aspect exhibits similar advantages and may exhibit similar features as the previously discussed aspect of the present invention.

BRIEF DESCRIPTION OF THE DRAWINGS

These and other aspects of the present invention will now be described in more detail, with reference to the appended drawings showing currently preferred embodiments of the invention.

FIG. 2 is an at least partly exploded perspective view of the piezoelectric transducer device of FIG. 1.

FIG. 3 is a partial, cross-sectional side view of a piezoelectric transducer device according to another embodiment of the present invention.

DETAILED DESCRIPTION

Figure 1:
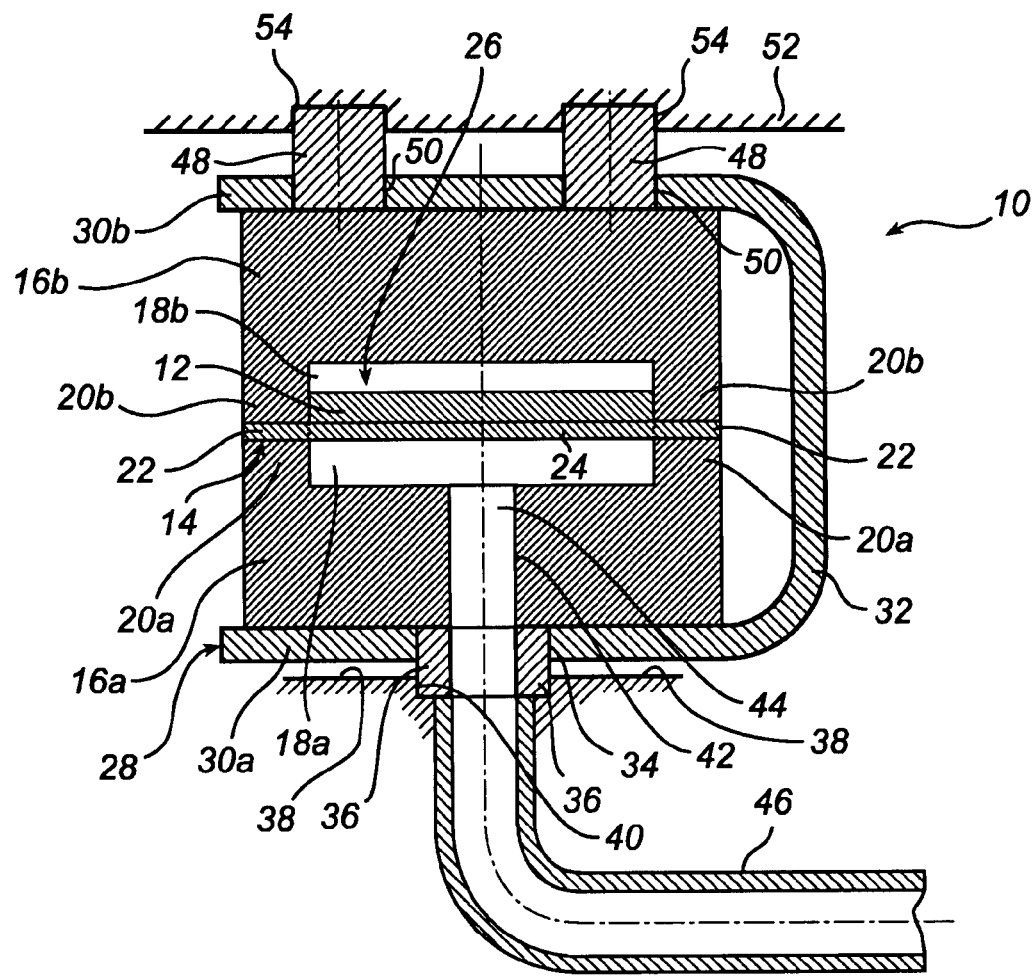
FIG. 1 is a cross-sectional side view of a piezoelectric transducer device according to an embodiment of the present invention.

FIGS. 1 and 2 illustrate a transducer device 10 according to an embodiment of the present invention. The transducer device 10 is generally adapted to convert electrical signals to acoustic signals, and vice versa, i.e. it is an electro-acoustic transducer.

The transducer device 10 comprises a piezoelectric element 12 centrally mounted on one side of an acoustic membrane 14. The piezoelectric element 12 and acoustic membrane 14 are preferably circular as shown in FIG. 2, but may have other shapes as well, for instance rectangular. The piezoelectric element 12 may for instance be made of piezo-crystal, while the acoustic membrane 14 may be made of thin metal, for instance brass or stainless steel or the like. The material selection depends among other things on the wanted acoustic characteristics and expected operating environment. The piezoelectric element 12 may be mounted on the acoustic membrane 14 by gluing, e.g. Further, the diameter of the piezoelectric element 12 may be in the order of 14 mm, while the diameter of the acoustic membrane 14 may be in the order of 20 mm.

The transducer device 10 further comprises two elastic damping elements 16a, 16b. The elastic damping elements 16a, 16b are oppositely arranged, one on each side of the piezoelectric element 12 and acoustic membrane 14. Facing the acoustic membrane 14, the elastic damping element 16a, 16b have opposed circular based recesses 18a, 18b forming annular protrusions 20a, 20b, respectively, such that the elastic damping element 16a contacts and supports one side of a peripheral portion 22 of the acoustic membrane 14 and the other elastic damping element 16b contacts and supports the opposite side of the peripheral portion 22 of the acoustic membrane 14, while a central non-supported portion 24 of the acoustic membrane 14 (as well as the piezoelectric element 12) is accommodated in a cavity 26 formed by the two circular based recesses 18a, 18b. Thus, the peripheral portion 22 of the acoustic membrane 14 becomes sandwiched between the elastic damping elements 16a, 16b, and the cavity 26 is divided by the piezoelectric element 12 and acoustic membrane 14. Preferably, the supported peripheral portion 22 comprises a vibration node of the acoustic membrane 14. To this end, for the 20 mm acoustic membrane 14, the supported peripheral portion 22 may have an outer diameter of 20 mm and an inner diameter of about 14 mm. Consequently, the inner diameter of the circular based recesses 18a, 18b are 14 mm in this particular case. The elastic damping elements 16a, 16b should be made of a suitable material, such as rubber or the like. If the acoustic membrane 14 has a non-circular shape (e.g. a rectangular shape), the elastic damping element 16a, 16b should be shaped correspondingly to match the acoustic membrane 14.

It should be noted that the above dimensions are exemplary, and may vary for instance depending on the desired resonance frequency. Also, the outer diameter of the elastic damping elements 16a, 16b may be different than the diameter of the acoustic membrane 14. Also, the diameter of the piezoelectric element 12 may be different than the inner diameter of the supported peripheral portion 22/circular based recesses 18a, 18b.

The transducer device 10 further comprises a U-shaped clamp 28. The U-shaped clamp 28 has two substantially parallel, flat arms 30a, 30b linked by a portion 32, the arms 30a, 30b forming surfaces between which the two elastic damping elements 16a, 16b (and consequently the piezoelectric element 12 and acoustic membrane 14) are clamped. The U-shaped clamp 28 is so formed that when the two elastic damping elements 16a, 16b are placed between the arms 30a, 30b, a force is produced pressing the two elastic damping elements 16a, 16b in a direction against each other (along the z-direction in FIG. 2), whereby the peripheral portion 22 of the acoustic membrane 14 becomes firmly secured between the two elastic damping elements 16a, 16b. To this end, the U-shaped clamp 28 may be sized so that the gap between the two arms 30a, 30b is initially somewhat narrower than the total height of the stack comprising the two elastic damping elements 16a, 16b and the piezoelectric element 12 and acoustic membrane 14, causing the two elastic damping elements 16a, 16b to be compressed when fitted between the arms 30a, 30b. Additionally or complementary, the U-shaped clamp 28 may be somewhat resilient from a steady or non-biased state, so that when a larger stack (the two elastic damping elements 16a, 16b and the piezoelectric element 12 and acoustic membrane 14) is pushed into the U-shaped clamp 28, a force pressing the stack together is produced as the U-shaped clamp 28 strives back towards the non-biased state. To this end, the U-shaped clamp 28 is preferably made of metal, but could for some applications be made of plastics. Optionally, at least one of the two elastic damping elements 16a, 16b may be provided with outer flanges or the like (not shown) for laterally supporting the elastic damping elements 16a, 16b in relation to each other. Also, the width of the arms 30a, 30b is preferably matched to that of the elastic damping elements 16a, 16b. Wider arms 30a, 30b will keep the elastic damping elements 16a, 16b clamped, but may result in an undue size of the transducer device 10. Narrower arms may also keep the elastic damping elements 16a, 16b clamped, but may fail to provide satisfactory rotary support.

Further, the U-shaped clamp 28 comprises a through opening 34 in the bottom arm 30a in FIGS. 1 and 2. The through opening 34 is substantially aligned with the centre of the piezoelectric element 12 and acoustic membrane 14. The through opening 34 is adapted to receive an additional elastic damping element 36 having an annular or ring shape. The additional elastic damping element 36 is fitted towards the inside of the through opening 34 and extends outside the clamp 28, downwards in FIG. 1. The additional elastic damping element 36 serves to resiliently support the transducer device against an bottom external base 38 and functions as a bottom mounting point of the transducer device 10. The additional elastic damping element 36 may for instance be made of the same type of material as the elements 16a, 16b. The additional elastic damping element 36 and the lower element 16a may even be formed as a single piece of material. Preferably, the bottom external 38 base comprises a recesses 40 for receiving the additional elastic damping element 36, whereby no gluing or the like is necessary to attach the transducer device 10 at this point.

Further, together with a corresponding second through opening 42 provided in the bottom elastic damping element 16a leading to the portion of the cavity 26 formed by the recess 18a, the through opening 34 with the additional elastic damping element 36 creates a channel 44 through which acoustic signals can travel. At the end of the channel 44 opposite the end towards the acoustic membrane 14, there is provided a waveguide 46. The waveguide 46 may be part of the transducer device 10 or an external waveguide. Through the channel 44, the waveguide 46 is in acoustic communication with the acoustic membrane 14, i.e. acoustic signals can travel between the waveguide 46 and the acoustic membrane 14. The cross-sections of the illustrated through opening 34, additional elastic damping element 36, second through opening 42, channel 44, and waveguide 46 are circular, but could have other shapes, such as square or rectangular.

The transducer device 10 further comprises (upper) elastic damping elements 48 provided in holes 50 in the top arm 30b of the U-shaped clamp 38. Here the number of upper elastic damping elements 48 and holes 50 is four, but a different number may be used. The upper elastic damping elements 48 serve to resiliently support the transducer device against an (upper) external base 52 and function as top mounting points of the transducer device 10. Also, when arranged one essentially in each corner of the top arm 30b (i.e. square or rectangular pattern) as in FIG. 2, they serve to support the clamp from tilting or rotating around both the x- and y-directions. The holes 50 serve to laterally secure the upper elastic damping elements 48, and no gluing or the like of the upper elastic damping elements 48 to the rest of the transducer device is necessary. The upper elastic damping elements 48 may for instance be made of the same type of material as the elements 16a, 16b, and be formed as rectangular or circular blocks (with matched holes 50). The upper elastic damping elements 48 and the upper element 16b may even be formed as a single piece of material. Preferably, the upper base 52 comprises recesses 54 for receiving the upper elastic damping elements 48, whereby no gluing or the like is necessary to attach the transducer device 10 at these points.

In a method of assembling the present transducer device 10, the piezoelectric element 12 is first attached to the acoustic membrane 14. The piezoelectric element 12 and acoustic membrane 14 assembly is then placed between the two elastic damping elements 16a, 16b so that the peripheral portion 22 of the acoustic membrane 14 becomes sandwiched therebetween. The stack comprising the piezoelectric element 12 and acoustic membrane 14 and elastic damping elements 16a, 16b is then inserted into the U-shaped clamp 28 so that the stack gets clamped, i.e. hold tightly, between the two flat arms 30a, 30b of the U-shaped clamp 28, whereby the peripheral portion 22 of the acoustic membrane 14 is safely secured between the two opposed elastic damping elements 16a, 16b. Thereafter, the transducer device 10 may be secured to the external bases 38 and 52.

Optionally, the transducer device 10 may be surrounded by a housing (not shown) which is open towards the bottom but otherwise closed. The housing functions as a diving bell should the transducer device be submersed in liquid, avoiding that liquid enters the transducer and causes it to malfunction.

During an exemplary operation of the transducer device 10, an electric signal is supplied to the piezoelectric element 12 (electrical connections and controllers are not shown in FIGS. 1-2). In response thereto, the piezoelectric element 12 starts to vibrate, which vibration is passed on to the acoustic membrane 14 whereto the piezoelectric element 12 is mounted and causes the acoustic membrane 14 to transmit an acoustic signal corresponding to the supplied electric signal. The acoustic signal may be guided out of the transducer device 10 by means of the channel 44 and further away by means of the waveguide 46. Conversely, when an acoustic signal from the waveguide 46 is received by the acoustic membrane 14, it starts to vibrate, which vibration is passed on to the piezoelectric element 12 mounted to the acoustic membrane 14, which piezoelectric element 12 is response thereto generates an electric signal corresponding to the received acoustic signal.

Due to the provision of the elastic damping elements 16a, 16b securing a peripheral portion 22 of the acoustic membrane 14, vibrations in the acoustic membrane 14 during operation are damped so that short, distinct signals (both input and output signals) may be provided. That is, any ringing or reverberations following the main signal or pulse are damped or cancelled. Further, since the clamp 28 provides the force for securing the acoustic membrane 14, the pressure of the elastic damping elements 38, 52 may be kept relatively small, whereby transfer of unwanted vibrations between the transducer device 10 and the external bases 38, 52 may be efficiently damped. Also, the elastic damping elements 16a, 16b may additionally reduce such transfer. Further, should the elastic damping elements 16a, 16b shrink or expand somewhat due to environmental conditions, e.g. changed temperature and/or change in surrounding medium, such changes would be "absorbed" by the resilient U-shaped clamp 28 maintaining the acoustic membrane 14 safely secured between the elastic damping elements 16a, 16b, so that the function and operation of the transducer device 10 the is not degraded.

FIG. 3 is a partial, cross-sectional side view of a piezoelectric transducer device according to another embodiment of the present invention. The device 10 in FIG. 3 is similar to that of FIGS. 1-2, but here both the two elastic damping elements 16a, 16b extend further towards the centre of the acoustic membrane-piezoelectric element 14, 12 such that the elastic damping element 16b also engages a portion of the piezoelectric element 12, e.g. as illustrated in FIG. 3. In other words, a portion of the membrane 14 is sandwiched between the two elastic damping elements 16a, 16b with the piezoelectric element 12 as an intermediate member.

In FIG. 3, also electrical connections are shown. Namely, the device 10 of FIG. 3 comprises two electrically conducting wires 56a and 56b. Specifically, the wire 56a bear against the membrane 14 and is pressed there against by means of the elastic damping element 16b in combination with the element 16a and the clamp (not shown in FIG. 3) such that the wire 56a is held in place and electrical connection is established between the membrane 14 and the wire 56a. Likewise, the wire 56b is sandwiched between the piezoelectric element 12 and the elastic damping element 16b at a position where the elastic damping element 16b engages the piezoelectric element 12, as illustrated in FIG. 3. The wires 56a, 56b should no be in electrical contact with each other, to avoid short-circuiting. To this end, the wire 56a may be placed between the damping element 16b and the membrane 14 as illustrated in FIG. 3, whereas the other wire 56b may be arranged through the elastic damping element 16b. The wire 56b may for instance be moulded into the element 16b. Alternatively, the element 16b may be formed by several pieces between two of which the wire 56b is placed. The element 16b, being made for instance of rubber, acts as an electrical insulator. The wires 56a, 56b are preferably thin, and may for instance be flat, foil-like wires. The outstanding ends of wires the 56a, 56b are preferably connected to a controller or the like (not shown). Also, the top of the piezoelectric element 12 may be provided with a silver coating or the like to promote electrical conduction.

Hence, no soldering or the like is necessary to connect the wires 56a, 56b to the acoustic membrane 14 and the piezoelectric element, respectively. Not using soldering is beneficial since a soldering may be adversely affected in some environments, for instance if the soldering is subjected to ethanol. Also, the elastic damping elements 16a, 16b beneficially prevents or at least alleviates vibrations in the wires 56a, 56b, which vibrations for instance may be caused by actuation of the acoustic membrane-piezoelectric element 14, 12, and which vibrations otherwise may negatively affect the measurement.

A preferred application of the present transducer device 10 is in a device for measuring the level of liquid in a tank, for instance in a vehicle such as a car or truck or boat, or in a basically stationary appliance. The liquid may for instance be water or gasoline or diesel or the like. An example of such a measurement device is disclosed in the document WO2005038415, the contents of which hereby is incorporated by reference. In such a measurement device, a waveguide (e.g. the waveguide 46) connected to the transducer device is adapted to extend into the liquid. Also, the waveguide preferably comprises a protruding reference element arranged a known distance from the transducer device. Upon operation, an acoustic signal transmitted by the present transducer device is guided by the waveguide towards the liquid surface. The wavelength of the acoustic signal is preferably in the interval about 2-10 cm, which corresponds to a frequency of about 3.4-17 kHz. Part of the signal is reflected by the reference element, and the rest of the signal is reflected by the liquid surface. The two reflected acoustic signals are then guided back through the waveguide to the transducer device, which generate an electric signal upon reception of each acoustic signal. The transit time of the signal reflected by the reference element is used to calculate the current acoustic signal speed (speed of sound), and the transit time of the signal reflected by the liquid level is used together with the current signal speed to calculated the liquid level in the tank. The time between the signals (especially the time between the two received acoustic signals) may be very short, whereby the short, distinct signals of the present transducer device 10 becomes useful. Further, extensive vibrations usually occur in a vehicle such as a car or boat during operation, but the support structure (damping elements and clamp) of the present transducer device may at least partly prevent such vibrations to reach the piezoelectric element and acoustic membrane, as explained above. Such vibrations could otherwise cause erroneous detections. Further, the liquid in the tank can cause the elastic damping parts 16a, 16b to swell, but such a swell may be taken up by the resilient U-shaped clamp 28, as explained above.

The person skilled in the art realizes that the present invention by no means is limited to the preferred embodiment described above. On the contrary, many modifications and variations are possible within the scope of the appended claims, as e.g. indicated in the above summary and description.

The invention claimed is:

1. A transducer device, comprising:
   an acoustic membrane;
   a piezoelectric element mounted to the acoustic membrane;
   two oppositely arranged elastic damping elements between which a peripheral portion of the acoustic membrane is sandwichably supported; and
   a clamp having two surfaces between which the two elastic damping elements are clamped so that the two elastic damping elements are pressed together, whereby the peripheral portion of the acoustic membrane is secured between the two elastic damping elements.

2. A transducer device according to claim 1, wherein the clamp is substantially U-shaped.

3. A transducer device according to claim 1, wherein the clamp is provided with an through opening to allow acoustic communication between the acoustic membrane and a waveguide.

4. A transducer device according to claim 1, further comprising at least one further elastic damping element for attaching the rest of the transducer device to an external base.

5. A transducer device according to claim 4, wherein the at least one further elastic damping element is fitted in at least one hole in the clamp.

6. A transducer device according to claim 1, wherein the clamp is made of metal.

7. A transducer device according to claim 1, wherein the peripheral portion of the acoustic membrane includes a vibration node of the acoustic membrane.

8. A transducer device according to claim 1, wherein each of the two opposed elastic damping elements comprises a recess, the two recesses together forming a cavity for accommodating a non-supported portion of the acoustic membrane.

9. A transducer device according to claim 1, further comprising at least one electrically conducting wire in contact with the acoustic membrane and/or the piezoelectric element, which at least one wire is sandwiched in the device between the elastic damping elements.

10. A method of assembling a transducer device comprising a piezoelectric element mounted to an acoustic membrane, the method comprising the steps of:
    placing the acoustic membrane between two elastic damping elements embodied so that a peripheral portion of the acoustic membrane is sandwichably supported therebetween; and
    placing the two elastic damping elements between two surfaces of a clamp so that the two elastic damping elements are pressed together, whereby the peripheral portion of the acoustic membrane is secured between the two elastic damping elements.

* * * * *